(12) United States Patent
Colletti et al.

(10) Patent No.: US 10,688,833 B2
(45) Date of Patent: Jun. 23, 2020

(54) TYRE TREAD

(71) Applicant: BRIDGESTONE CORPORATION, Tokyo (JP)

(72) Inventors: Marco Colletti, Rome (IT); Marco Del Duca, Rome (IT); Nello Palomba, Rome (IT); Daniele Cristadoro, Rome (IT); Emiliano De Rosa, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 224 days.

(21) Appl. No.: 15/573,025

(22) PCT Filed: Jun. 1, 2016

(86) PCT No.: PCT/EP2016/062330
§ 371 (c)(1),
(2) Date: Nov. 9, 2017

(87) PCT Pub. No.: WO2016/198296
PCT Pub. Date: Dec. 15, 2016

(65) Prior Publication Data
US 2018/0162171 A1   Jun. 14, 2018

(30) Foreign Application Priority Data
Jun. 12, 2015   (IT) .................. 102015000023163

(51) Int. Cl.
*B60C 11/12* (2006.01)
*B60C 11/03* (2006.01)
*B60C 11/13* (2006.01)

(52) U.S. Cl.
CPC ...... *B60C 11/1218* (2013.01); *B60C 11/0306* (2013.01); *B60C 11/125* (2013.01);
(Continued)

(58) Field of Classification Search
CPC ............ B60C 11/1218; B60C 11/125; B60C 11/1259; B60C 11/1281; B60C 11/1392;
(Continued)

(56) References Cited

U.S. PATENT DOCUMENTS

| 6,591,880 B1 * | 7/2003 | Matsumoto ......... B60C 11/0309 |
| | | 152/209.15 |
| 6,796,347 B1 * | 9/2004 | Matsuzaki ............ B60C 11/11 |
| | | 152/209.15 |

(Continued)

FOREIGN PATENT DOCUMENTS

| JP | 2004-330812 A | 11/2004 |
| JP | 2007-223493 A | 9/2007 |

OTHER PUBLICATIONS

International Search Report for PCT/EP2016/062330, dated Sep. 1, 2016 (PCT/ISA/210).
(Continued)

*Primary Examiner* — Jacob T Minskey
*Assistant Examiner* — Virak Nguon
(74) *Attorney, Agent, or Firm* — Sughrue Mion, PLLC

(57) ABSTRACT

A tyre tread (1) having a sculptured external surface including see-through sipes (71, 72, 73) at an intermediate land region (4), wherein each of such sipes extends according to a straight line defining a low inclination angle ($\alpha$, $\beta$, $\gamma$) with respect to a tread width direction (W), such sipes being also surrounded by respective chamfered areas (81, 82, 83) (FIG. 1).

18 Claims, 1 Drawing Sheet

(52) U.S. Cl.
CPC ...... *B60C 11/1259* (2013.01); *B60C 11/1281* (2013.01); *B60C 11/1392* (2013.01); *B60C 2011/1209* (2013.01)

(58) Field of Classification Search
CPC ... B60C 11/1384; B60C 11/03; B60C 11/124; B60C 2011/1227
See application file for complete search history.

(56) References Cited

U.S. PATENT DOCUMENTS

| | | | |
|---|---|---|---|
| 8,459,320 B2* | 6/2013 | Miyazaki | B60C 11/0302 152/209.15 |
| 2001/0002603 A1* | 6/2001 | Ikeda | B60C 11/0318 152/209.18 |
| 2013/0206298 A1 | 8/2013 | Guillermou et al. | |
| 2014/0130952 A1* | 5/2014 | Tanaka | B60C 11/1315 152/209.24 |
| 2015/0183272 A1* | 7/2015 | Kaneko | B60C 11/11 152/209.25 |
| 2016/0236517 A1* | 8/2016 | Nagase | B60C 11/0332 |
| 2016/0303919 A1* | 10/2016 | Yamaoka | B60C 11/0332 |
| 2017/0361659 A1* | 12/2017 | Yamakawa | B60C 11/03 |

OTHER PUBLICATIONS

Written Opinion of the International Searching Authority for PCT/EP2016/062330, dated Sep. 1, 2016 (PCT/ISA/237).

* cited by examiner

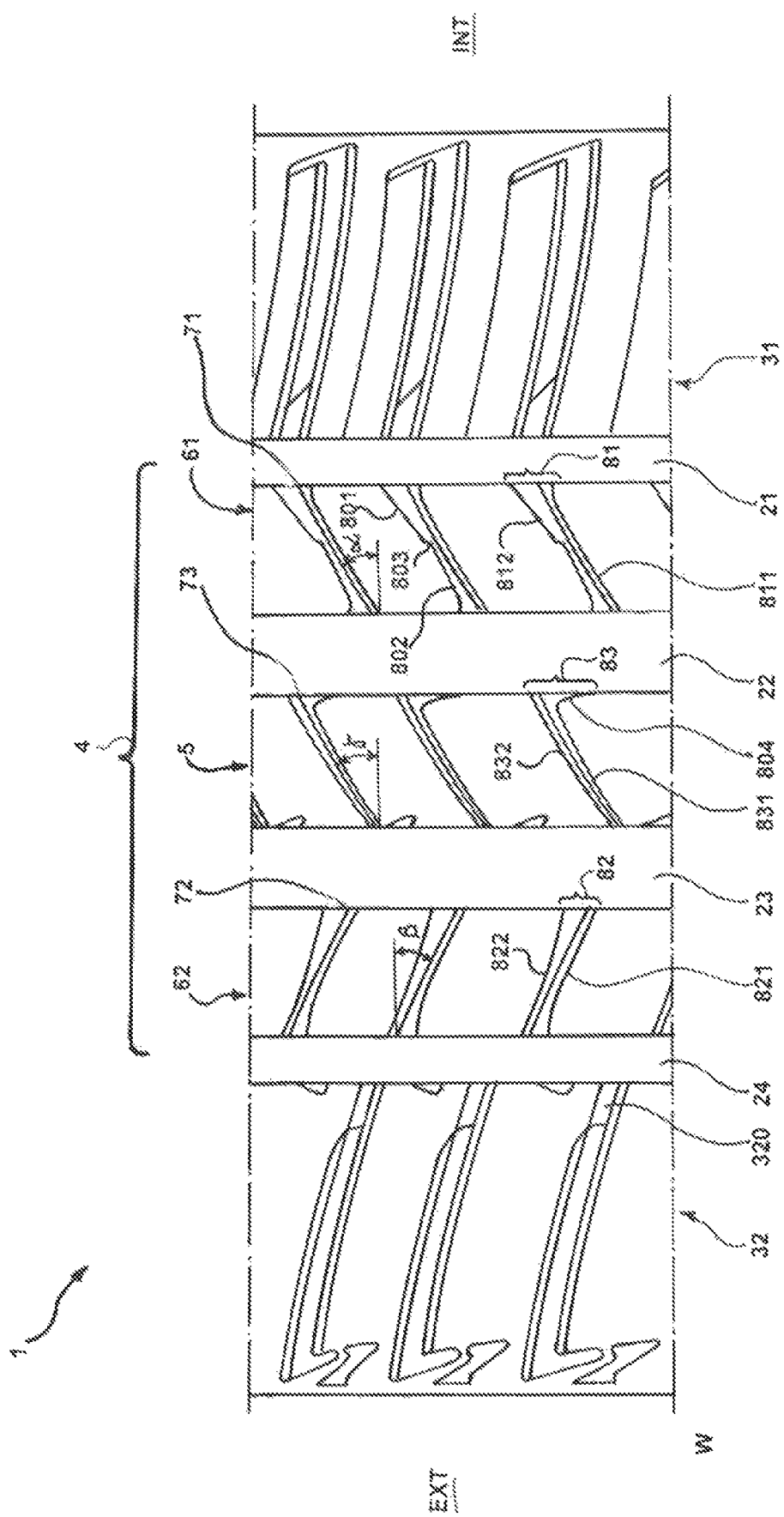

TYRE TREAD

CROSS REFERENCE TO RELATED APPLICATIONS

This application is a National Stage of International Application No. PCT/EP2016/062330 filed Jun. 1, 2016, claiming priority based on Italian Patent Application No. 102015000023163, filed Jun. 12, 2015, the contents of all of which are incorporated herein by reference in their entirety.

FIELD OF THE INVENTION

The present invention relates to tyre tread having a sculptured external surface defined by sipes and chamfers of selected geometry and arrangement.

The disclosed tyre tread is suitable to improve tyre performances.

BACKGROUND OF THE INVENTION

Tyre treads have a sculptured pattern defined by a plurality of profile elements. Typically, such profile elements comprise circumferential grooves alternated to circumferential ribs, which grooves and ribs extend about the tyre's axis.

Each rib may include a plurality of sub-elements, or blocks, separated by transversal cut edges.

Moreover, each block or rib can have partial cut-outs, or sipes, the radial extension of which stops before the full depth of the block or rib.

The external edges of each sipe may also be defined by, or associated with, a tapered, or chamfered, region.

The number, arrangement and geometry of the aforementioned profile elements, and in particular of the sipes and chamfered regions, influence, and in some cases determine, tyre performances. For example, such profile elements have effect upon wet adherence, braking, cornering and handling properties.

Despite significant investments have been made in the field, and quite a number of tread profile patterns have been proposed over the years, there is still a need for improvement. Such need is particularly felt for passenger (PSR) vehicles, wherein a single tyre tread design must provide a good level of performance in any working circumstance, and especially during braking, cornering and handling, both in wet and dry road conditions.

US 2013/206298 discloses a sculptured tyre tread having a plurality of transverse sipes delimiting respective blocks of a land region. End parts tapering in the longitudinal (circumferential) direction may be provided.

JP 2007-223493 discloses a sculptured tyre tread having longitudinal sipes with end portions tapering longitudinally.

SUMMARY OF THE INVENTION

The technical problem underlying the present invention is therefore to meet the needs and overcome the drawbacks mentioned above with reference to the known art.

The above problem is solved by a tyre tread according to claim 1 and by a tyre including it.

Preferred features of the invention are recited in the dependent claims.

The tyre tread according to the invention allows achieving an optimal compromise among tyre performances in both dry and wet conditions and in all driving circumstances, in particular braking, cornering and handling.

The tyre tread of the invention is particularly suitable for passenger vehicles and also for green Class A tyres.

The tyre tread of the invention has a plurality of sipes obtained upon an intermediate land region. According to preferred embodiments, each sipe may extend according to a straight line having a low inclination angle with respect to a tread width (horizontal) direction. In particular, such angle may be comprised in a range of about 15-40 deg, preferably 20-35 deg, most preferably 25-35 deg and still most preferably 15-35 deg.

Said low inclination angles increase the contribution of the sipe projection along the tread width direction—i.e. the sipe edge extension contributing to braking the vehicle—thus improving braking adherence.

In other words, said low inclination angles ensure a greater "edge-ingredient-effect" with respect to the tyres known in the art and therefore better performances of traction/braking, also in wet conditions.

According to preferred embodiments of the invention, the tyre tread is apt to reduce involution at the tread leading edge during braking. Such advantage may be obtained by providing a chamfered area surrounding each sipe. The chamfering is a tapering extending across the tread cross-section.

Preferably, each chamfered area is larger at one or both outermost side(s) of the respective land portion than in the central part. In this way, greater stiffness is maintained in the middle of the land portion, at the same time assuring an appropriate contact area.

Preferably, each chamfered area has a low depth, in particular comprised in a range of about 0.5-1.5 mm, preferably about 1.0 mm, which do not create resonances.

BRIEF DESCRIPTION OF THE DRAWINGS

Reference will be made to the FIGURE of the annexed drawing, wherein:

FIG. 1 shows an exemplary front view of a portion of a tyre tread according to a preferred embodiment of the present invention, in particular a view taken according to a plane parallel to the tyre rotation axis.

DETAILED DESCRIPTION OF PREFERRED EMBODIMENTS OF THE INVENTION

FIG. 1 shows a portion of a tyre tread, in particular for a passenger (PSR) car, according to a preferred embodiment of the invention.

The tyre tread is globally denoted by 1.

FIG. 1 also indicates schematically an external/outer (EXT) side and an internal/inner (INT) side of the tyre, defined according to the proximity to the vehicle chassis.

Moreover, FIG. 1 indicates a tread width (horizontal) direction W orthogonal to a tread circumferential/longitudinal extension.

Tread 1 has a sculptured external surface defined by a plurality of profile elements, in particular sipes and chamfered areas, as it will be explained in the following.

In the present context, "chamfered" will be used a synonymous of tapered, sloped or bevelled across the tread cross-section.

"Sipe" will be used to indicate, as known in the field, a cut-out, cutting or narrow groove, typically extending radially towards the inside of a tyre block or rib, stopping before full depth of the latter.

The main body of tyre tread 1 is defined by:
- a first and a second shoulder land portion, 31 and 32 respectively, positioned one at each outermost (inner or outer) side of tread 1 according to tread width direction W;
- four circumferential grooves, denoted with reference numbers from 21 to 24, each extending longitudinally along tread 1 between said shoulder land portions 31 and 32;
- an intermediate longitudinal land region, globally denoted by 4, it too extending between the shoulder land portions 31 and 32 and including a first lateral land portion 61, a second lateral land portion 62 and a central land portion 5.

In particular, going from the inner to outer side of tyre along direction W, tread 1 includes first shoulder portion 31, groove 21, first lateral land portion 61, groove 22, central land portion 5, groove 23, second lateral land portion 62, groove 24 and second shoulder portion 32.

Each land portion 61, 62 and 5 has a plurality of see-through sipes, each denoted by 71 for first lateral land portion 61, with 72 for second lateral land portion 62 and with 73 for central land portion 5. "See-through" sipe means a sipe extending across the respective land portion from side to side.

Preferably, each sipe 71, 72 or 73 extends onto the tread surface according to a substantially straight line.

According to a preferred embodiment, said straight extension of each see-through sipe 71, 72 or 73 defines a low inclination angle with respect to tread width direction W. Such angle is denoted as first angle α for sipes 71, as second angle β for sipes 72 and as third angle γ for sipes 73. In particular, each of such angles may be comprised in a range of about 25-30 deg.

In the present embodiment, first inclination angle α and third inclination angle γ are opposite to second inclination angle β. In other words, first sipes 71 and third sipes 73 have opposite slant or orientation with respect to second sipes 72.

In particular, first sipes 71 and third sipes 73 extend, in a front view, according to inclination angles α and γ such that the straight line elevates from the tread external side to the tread inner side. On the contrary, preferably second sipes 72 extends, in a front view, according to inclination angles β such that the straight line elevates from the tread internal side to the tread external side.

Preferably, each sipe 71, 72 or 73 has a variable depth in the tread width direction W, in particular a lower depth at its central part. In this way, greater stiffness is maintained in the middle of the land portion.

Advantageously, each sipe 71, 72 or 73 is surrounded by a respective first chamfered area 81, second chamfered area 82 or third chamfered area 83.

Each first chamfered area 81 has a first part and a second part, extending at opposite (upper or lower) longitudinal sides of the respective sipe 71.

In particular, a first part of chamfered area 81 occupies a first longitudinal (lower) side of see-through sipe 71 and is defined between a wall edge of see-through sipe 71 and a first end profile 811. The latter is substantially, or mainly, parallel to the straight line extension of see-through sipe 71.

Preferably, a second part of first chamfered area 81 occupies a second longitudinal (upper) side of see-through sipe 71 and is defined between a wall edge of see-through sipe 71 and a second end profile 812. The latter extends according to a broken line, the latter being in particular a zig-zag line or a line which is formed by substantially straight line segments having different directions.

In particular, the second end profile 812 may be defined by three substantially straight line portions, in particular two lateral longer line portions 801 and 802, each extending according to a low inclination angle with respect to tread width direction W, and an intermediate shorter line portion 803 extending according to a higher inclination angle with respect to direction W. Such inclination angles may be included in a range of about 25-45 deg (801), 20-40 deg (802), and 70-90 deg (803) respectively.

Preferably, the first part of each first chamfered area 81 has a lower area extension than the corresponding second part.

In the present embodiment, both the first and the second chamfered areas 81 and 82 have enlarged lateral parts. In other words, each chamfered area 81 or 82 is larger at both outermost sides of respective land portion 61 or 62 than in the central part.

Also each second chamfered area 82 or third chamfered area 83 has a first part and a second part, extending at opposite (upper or lower) longitudinal sides of the respective sipe 72 or 73.

In particular, a first part of each chamfered area 82 or 83 occupies a first longitudinal (lower) side of see-through sipe 72 or 73 and is defined between a wall edge of see-through sipe 72 or 73 and a first end profile 821 or 831.

Preferably, a second part of each second chamfered area 82 or third chamfered area 83 occupies a second longitudinal (upper) side of the respective sipe 72 or 73 and is defined between a wall edge of sipe 72 or 73 and a second end profile 822 or 832.

In the present embodiment, each of said first and second end profile 821 and 822 of second chamfered area 82 extends substantially, or mainly, parallel to the straight line extension of the respective second see-through sipe 72.

Preferably, also each second end profile 832 of third chamfered areas 83 extends substantially, or mainly, parallel to the straight line extension of the respective sipe 73.

In the present example, each first end profile 831 of third chamfered areas 83 has a lateral terminal segment 804 shaped as an inverted "U". Such terminal segment 804 defines a sub-part of enlarged area and is preferably arranged at the tread inner side.

In the present embodiment, second shoulder portion 32 has open lugs 320 for improved block stiffness.

The present invention has been described so far with reference to preferred embodiments. It is intended that there may be other embodiments which refer to the same inventive concept and fall within the scope of the following claims.

The invention claimed is:
1. A tyre tread, having:
two shoulder land portions, each one of said two shoulder land portions being positioned at a respective outermost side of a tread width direction orthogonal to a tread circumferential extension;
four circumferential grooves, each of the four circumferential grooves extending longitudinally along the tread between said two shoulder land portions; and
an intermediate circumferential land region, extending between said two shoulder land portions, and comprising at least a first circumferential land portion having a plurality of first see-through sipes,
wherein each of said first see-through sipes extends across the first circumferential land portion from side to side,
wherein each first see-through sipe extends upon a tread surface according to a substantially straight line, wherein each first see-through sipe has a low inclination angle with respect to said tread width direction, comprised in a range of about 25-30 deg, wherein each first see-through sipe is surrounded by a first chamfered area, wherein said first chamfered area has a first part, arranged at a first longitudinal side of said each first see-through sipe and defined between a wall edge of said each first see-through sipe and a first end profile extending substantially, or mainly, parallel to the straight line extension of said each first see-through sipe, and wherein said first chamfered area has a second part, arranged at a second longitudinal side of said each first see-through sipe and defined between a wall edge of said first sipe and a second end profile extending substantially according to a broken zig-zag line, wherein said intermediate circumferential land region comprises said first circumferential land portion as a first lateral land portion, a second lateral circumferential land portion and a third central circumferential land portion arranged between the first and second lateral land portions, one of said grooves being interposed between each couple of adjacent shoulder/land or land/land portions, wherein said second lateral land portion and/or said third central land portion has a plurality of respective second or third see-through sipes, wherein each of said second or third see-through sipes extends across second lateral land portion or third central land portion from side to side, wherein each of said second and/or third see-through sipes is surrounded by a respective second and/or third chamfered area, and wherein each chamfered area has a depth equal to 1 mm.

2. The tyre tread according to claim 1, wherein said first part of said first chamfered area has a lower area extension than said second part of said first chamfered area.

3. The tyre tread according to claim 1, wherein said second end profile of said second part of said first chamfered area is defined by three substantially straight line segments; two lateral longer line segments, each extending according to a low inclination angle with respect to said tread width direction, and an intermediate shorter line segment extending according to a higher inclination angle with respect to said tread width direction, said lower and higher inclination angles being included in a range of about 25-45 deg, 20-40 deg, and 70-90 deg respectively.

4. The tyre tread according to claim 1, wherein each first see-through sipe extends, in a front view, according to said inclination angle such that said straight line elevates from the tread outer side to the tread inner side.

5. The tyre tread according to claim 1, wherein said first circumferential land portion is a lateral land portion positioned adjacent to one of said shoulder land portions and separated therefrom by one of said grooves, wherein said first circumferential land portion is configured to be arranged at the inner side of the tread.

6. The tyre tread according to claim 1, wherein each of said second or third see-through sipes extends upon a tread surface according to a substantially straight line.

7. The tyre tread according to claim 6, wherein each of said second or third see-through sipes has a respective second or third low inclination angle with respect to said tread width direction, comprised in a range of about 15-40 deg.

8. The tyre tread according to claim 6, wherein each of said first and third see-through sipes have respective inclination angles with respect to said tread width direction which are substantially opposite to a corresponding inclination angle of each of said second see-through sipes.

9. The tyre tread according to claim 6, wherein each of said second see-through sipes extends, in a front view, according to an inclination angle such that said straight line elevates from the tread inner side to the tread outer side.

10. The tyre tread according to claim 6, wherein each of said third see-through sipes extends, in a front view, according to an inclination angle such that said straight line elevates from the tread outer side to the tread inner side.

11. The tyre tread according to claim 1, wherein each of said second and/or third chamfered areas has:
a first part, extending at a first longitudinal side of the respective second or third see-through sipe and defined between a wall edge of said second or third see-through sipe and a respective first end profile; and
a second part, extending at a second longitudinal side of the respective second or third see-through sipe and defined between a wall edge of the respective second or third see-through sipe and a second end profile.

12. The tyre tread according to claim 11, wherein said first or second end profile of said second chamfered area extends substantially, or mainly, parallel to a straight line extension of the respective second see-through sipe.

13. The tyre tread according to claim 11, wherein said second end profile of said third chamfered area extends substantially, or mainly, parallel to a straight line extension of the respective third see-through sipe.

14. The tyre tread according to claim 11, wherein said first end profile of said third chamfered area has a terminal lateral segment shaped as an inverted "U", so as to define an enlarged area sub-part, which terminal segment is arranged at a tread inner side.

15. The tyre tread according to claim 1, wherein said first and/or second chamfered areas have lateral parts of enlarged area.

16. The tyre tread according to claim 1, where in each of said first, second and/or third see-through sipes have a variable depth in said tread width direction, and have a greater depth at the lateral parts of the sipe.

17. A tyre including a tread according to claim 1.

18. A tyre according to claim 17, which is a passenger car tyre.

* * * * *